(12) United States Patent
Miller

(10) Patent No.: US 8,905,134 B2
(45) Date of Patent: Dec. 9, 2014

(54) WELLBORE SERVICING COMPOSITIONS AND METHODS OF MAKING AND USING SAME

(75) Inventor: Matthew Lynn Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 362 days.

(21) Appl. No.: 13/412,540

(22) Filed: Mar. 5, 2012

(65) Prior Publication Data
US 2013/0228333 A1 Sep. 5, 2013

(51) Int. Cl.
*E21B 33/13* (2006.01)
(52) U.S. Cl.
USPC ............ 166/293; 166/300; 166/305.1; 175/72
(58) Field of Classification Search
None
See application file for complete search history.

(56) References Cited

U.S. PATENT DOCUMENTS

| | | | |
|---|---|---|---|
| 3,316,965 A * | 5/1967 | Watanabe | 166/280.1 |
| 3,455,390 A * | 7/1969 | Gallus | 166/295 |
| 3,753,903 A | 8/1973 | Fischer et al. | |
| 3,882,029 A * | 5/1975 | Fischer et al. | 507/213 |
| 4,481,121 A | 11/1984 | Barthel | |
| 4,620,596 A * | 11/1986 | Mondshine | 166/292 |
| 6,105,691 A | 8/2000 | Hayatdavoudi et al. | |
| 6,187,719 B1 | 2/2001 | Dino et al. | |
| 7,705,099 B2 | 4/2010 | Hoskins | |
| 8,107,155 B2 | 1/2012 | Bita et al. | |
| 2007/0084600 A1* | 4/2007 | Braden | 166/278 |
| 2007/0244013 A1* | 10/2007 | Hoskins | 507/117 |
| 2010/0193244 A1 | 8/2010 | Hoskins | |

FOREIGN PATENT DOCUMENTS

EP 2433999 A1 3/2012
WO 2010133175 A1 11/2010

OTHER PUBLICATIONS

Foreign communication from a related counterpart application—International Search Report and Written Opinion, PCT/US2013/021226, Mar. 20, 2013, 11 pages.

* cited by examiner

*Primary Examiner* — Zakiya W Bates
(74) *Attorney, Agent, or Firm* — Holly Soehnge; Conley Rose, P.C.

(57) ABSTRACT

A method of servicing a wellbore comprising identifying lost circulation zone within a wellbore; and placing in the wellbore a composition comprising a wax and a water-based mud wherein placement of the composition reduces or prevents a loss of fluids to the lost circulation zone. A wellbore servicing fluid comprising a water-based mud, a sized calcium carbonate particle and a wax.

15 Claims, 5 Drawing Sheets a b a b c

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure generally relates to wellbore servicing. More specifically, this disclosure relates to materials for treating lost circulation.

2. Background

Natural resources such as gas, oil, and water residing in a subterranean formation can be recovered by drilling wells into the formation. Well drilling involves drilling a wellbore down to the formation while circulating a drilling fluid or mud through the wellbore. Various types of drilling fluids, also known as drill-in fluids when used in the productive interval, have been used in well drilling, such as water-based fluids, mineral oil-based fluids, and synthetic oil-based fluids.

The subterranean formation is then usually isolated from other formations using a technique known as well cementing. Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may pumped down the wellbore to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

In addition to the fracturing fluid, other fluids used in servicing a wellbore may also be lost to the subterranean formation while circulating the fluids in the wellbore or otherwise placing fluids in the wellbore. In particular, the fluids may enter and be "lost" to the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being terminated and/or too low to allow for further drilling of the wellbore. Such conditions may be referred to as partial or complete loss of circulation or lost circulation.

Conventional methods of treating lost circulation take into consideration many aspects related to the type of wellbore servicing operation being carried out. One such aspect involves removal of the materials used to treat lost circulation subsequent to drilling the wellbore. For example, some materials used to treat lost circulation are subsequently removed by degrading the materials with acid. In such instances the wellbore servicing operation faces challenges associated with both the handling of large volumes of acid in addition to the potential for formation damage.

Accordingly, an ongoing need exists for compositions and methods of treating lost circulation.

SUMMARY

Disclosed herein is a method of servicing a wellbore comprising identifying lost circulation zone within a wellbore and placing in the wellbore a composition comprising a wax and a water-based mud wherein placement of the composition reduces or prevents a loss of fluids to the lost circulation zone. Also disclosed herein is a wellbore servicing fluid comprising a water-based mud, a sized calcium carbonate particle and a wax.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
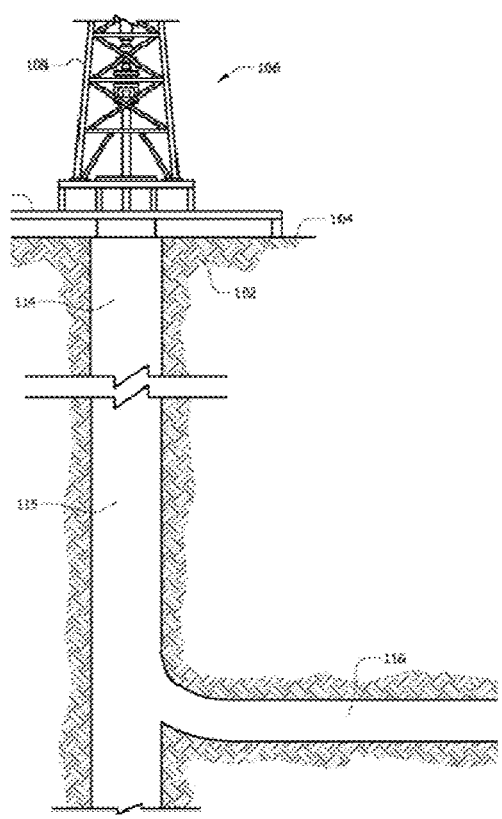
FIG. 1 is a partial cutaway view of a wellbore penetrating a subterranean formation.
Figure 2:
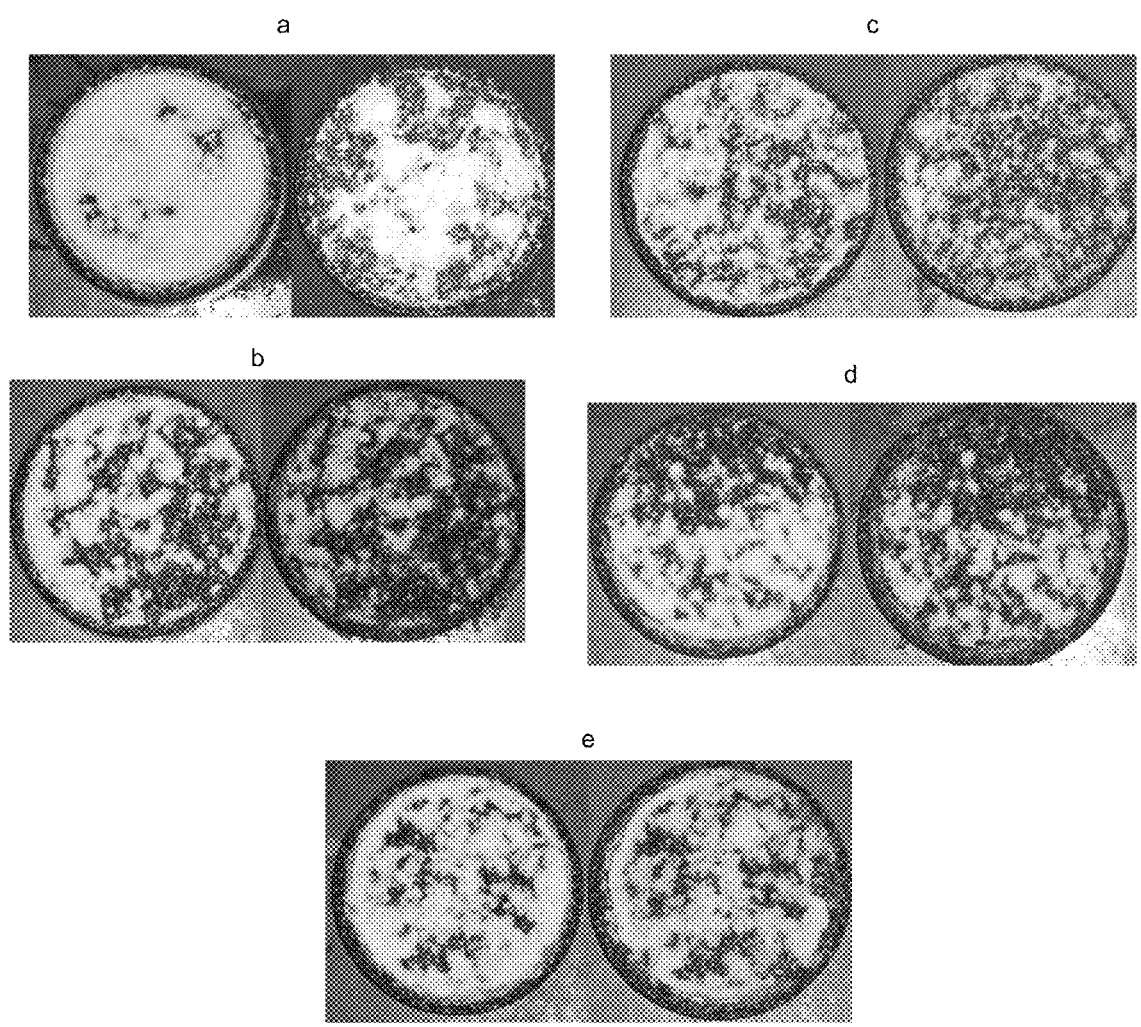
FIGS. 2a-2e, 3a, 3b, and 4a-4c are images of screens treated with samples from Example 4.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are compositions and methods for the treatment of lost circulation. In an embodiment, the composition comprises a drilling fluid and a wax material which is placed into a subterranean formation experiencing lost circulation. The wax material upon encountering an area of lost circulation may reduce or prevent the loss of fluids into lost circulation zones such as voids, vugular zones, and natural or induced fractures. Hereinafter, compositions comprising a drilling fluid and a wax material for use in the treatment of lost circulation are termed lost circulation treatment compositions (LCTC).

In an embodiment, the LCTC comprises a wax material. Herein wax refers to organic materials that are solid at 20° C. (68° F.) and that melt without decomposition at or above 40° C. (104° F.). The wax may be a natural wax, a synthetic wax, or combinations thereof. In an embodiment, the wax is a hydrocarbon wax. In an embodiment, the LCTC comprises a synthetic wax. Such synthetic waxes may be further characterized by the presence of low molecular weight polymers such as for example and without limitation polypropylene; branched and linear polyethylene; polyethylene copolymers; polytetrafluoroethylene; fatty acid amines; polyamides and combinations thereof. Synthetic waxes may be prepared using any suitable methodology. For example, the synthetic wax may be prepared by the Fischer-Tropsch process; by degradation of higher molecular weight polyethylenes to obtain waxes with the desired molecular weight; or by polymerization of an alpha olefin monomer (e.g., ethylene or propylene).

In an embodiment, the wax is chemically homogeneous. In an alternative embodiment, the wax is chemically inhomogeneous and may be a blend of waxes. In an embodiment, the wax is a high melting point wax. Herein, a high melting point wax has a melting point in the range of from about 190° F. to about 500° F.; alternatively from about 250° F. to about 450° F.; or alternatively from about 275° F. to about 350° F. As will be understood by one of ordinary skill in the art, a chemically inhomogeneous wax may not display a discrete melting point characterized by a single temperature and instead may be characterized by a melting point range. In an embodiment, a chemically inhomogeneous wax suitable for use in this disclosure may display a melting point range falling within the disclosed ranges. In an embodiment, the high melting point wax is a functionalized wax, alternatively an oxidized wax.

In an embodiment, the LCTC comprises an oxidized wax. The oxidized wax may have been prepared by any suitable methodology. For example the oxidized wax may have been reacted with oxygen or an oxygen-containing gas at elevated temperatures. Without wishing to be limited by theory, oxidation of the wax changes the chemical composition via a free-radical mechanism, which converts hydrocarbon molecules of waxes into esters, acids, and other minor components. The resulting oxidized waxes may then display an increased melting point when compared to the wax before oxidation, high polarity and/or high functionality.

In an embodiment, an oxidized wax suitable for use in the present disclosure is further characterized by a saponification number in the range of from about 0 to about 150 mg KOH/g, alternatively from about 0 to about 100 or alternatively from about 0 to about 60. Herein, the saponification number refers to the number of milligrams of potassium hydroxide required to saponify one gram of fat. In an embodiment, an oxidized wax suitable for use in the present disclosure is further characterized by an acid number in the range of from about 0 to about 60 mg KOH/g, alternatively from about 0 to about 55 or alternatively from about 0 to about 50. Herein, the acid number refers to the mass of potassium hydroxide required to neutralize one gram of the wax.

In an embodiment, an oxidized wax suitable for use in the present disclosure is further characterized by a low oil-swellability. Herein, a low oil-swellability refers to the extent to which the oxidized wax material increases in volume upon contact with an oleaginous fluid. Examples of oleaginous fluids include, but are not limited to petroleum oils, natural oils, synthetically-derived oils, or combinations thereof. More particularly, examples of oleaginous fluids suitable include, but are not limited to, diesel oil, kerosene oil, mineral oil, synthetic oil such as polyolefins (e.g., alpha-olefins and/or internal olefins), polydiorganosiloxanes, esters, diesters of carbonic acid, paraffins, or combinations thereof. In an embodiment, an oxidized wax suitable for use in the present disclosure when contacted with an oleaginous fluid has an increase in volume of less than about 50%, alternatively less than about 45, 40, 35, 30, 25, 20, 15, 10, 5, or 1%.

In an embodiment, an oxidized wax suitable for use in this disclosure has a softening point of greater than about 200° F., alternatively greater than about 250° F., or alternatively greater than about 300° F. In an embodiment, an oxidized wax suitable for use in this disclosure has a maximum needle penetration at 77° F. of equal to or less than about 5 mm, alternatively less than about 3 mm, or alternatively less than about 2 mm. In an embodiment, an oxidized wax suitable for use in the present disclosure has a viscosity at 240° F. of less than about 50 centipoise (cps), alternatively less than about 40 cps, or alternatively less than about 30 cps. In an alternative embodiment, an oxidized wax suitable for use in the present disclosure has a viscosity at 300° F. of from about 200 cps to about 400 cps, alternatively from about 250 cps to about 400 cps, or alternatively from about 300 cps to about 400 cps.

In an embodiment, the LCTC comprises an oxidized polyethylene wax, a blend of oxidized polyethylene waxes, an oxidized polypropylene wax, a blend of oxidized polypropylene waxes or combinations thereof. Hereinafter, the disclosure will refer to the wax as an oxidized polyethylene wax although other waxes such as described herein are contemplated for use in the present disclosure. Examples of waxes suitable for use in this disclosure include without limitation OX-7 and MAPP40 which are polyethylene waxes commercially available from SSI Chusei USA.

In an embodiment, an oxidized polyethylene wax is present in the LCTC in an amount of from about 5 (pounds per barrel) lb/bbl to about 50 lb/bbl, alternatively from about 12 lb/bbl to about 40 lb/bbl, or alternatively from about 18 lb/bbl to about 35 lb/bbl.

In an embodiment, the LCTC comprises a water-based mud (WBM). Herein a WBM refers to a drilling fluid in which water or saltwater is the major liquid phase as well as the wetting (external) phase. In an embodiment, the aqueous fluid component of the WBM may generally comprise any suitable aqueous liquid. Examples of suitable aqueous fluids include, but are not limited to, sea water, freshwater, naturally-occurring and artificially-created brines containing organic and/or inorganic dissolved salts, liquids comprising water-miscible organic compounds, and combinations thereof. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride and calcium chloride. Examples of suitable bromide-based brines include, but are not limited to, sodium bromide, calcium bromide, and zinc bromide. Examples of suitable formate-based brines include, but are not limited to sodium formate, potassium formate, and cesium formate. In an embodiment, the WBM has a density ranging from about 8 pounds per gallon (ppg) to about 22 ppg, alternatively from about 10 ppg to about 20 ppg, or alternatively from about 12 ppg to about 18 ppg.

In an embodiment, the drilling fluid comprises a bridging agent. The bridging agent may generally comprise a solid, semi-solid, or particulate material. Not seeking to be bound by any particular theory, the bridging material may function to fill, partially fill, bridge, or seal pores and cracks in the lost circulation zone and function to enhance the effects of the wax in reducing or preventing the loss of fluid to the formation. Any suitable bridging agent compatible with the other components of the LCTC and able to function to enhance the effects of the wax in reducing or preventing the loss of fluid to the formation may be employed. In an embodiment, the bridging agent comprises a sized calcium carbonate material.

Examples of bridging agents suitable for use in this disclosure include without limitation the BARACARB series of bridging agents which are sized-ground marble products commercially available from Halliburton Energy Services.

In an embodiment, the bridging agent is present in the LCTC in an amount of from about 0 to about 90 lb/bbl, alternatively from about 7.5 lb/bbl to about 80 lb/bbl or alternatively from about 30 lb/bbl to about 75 lb/bbl.

The drilling fluid may comprise additional additives as deemed appropriate for improving the properties of the fluid. Such additives may vary depending on the intended use of the fluid in the wellbore. Examples of such additives include, but are not limited to, weighting agents, glass fibers, carbon fibers, suspending agents, conditioning agents, dispersants, water softeners, oxidation and corrosion inhibitors, bacteriacides, thinners, and combinations thereof. These additives may be introduced singularly or in combination using any suitable methodology and in amounts effective to produce the desired improvements in fluid properties. In an embodiment, the drilling fluid further comprises one or more lubricants. Lubricants may be included in WBMs to reduce torque and drag.

In an embodiment, a LCTC of the present disclosure comprises an oxidized polyethylene wax, sized calcium carbonate, and a WBM where the oxidized polyethylene wax is present in an amount of from about 10 lb/bbl to about 35 lb/bbl, and the sized calcium carbonate is present in an amount of from about 30 lb/bbl to about 90 lb/bbl.

The LCTCs disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are known in the art. The servicing fluid is for use in a wellbore that penetrates a subterranean formation. It is to be understood that "subterranean formation" encompasses both areas below exposed earth and areas below earth covered by water such as ocean or fresh water.

In an embodiment, the LCTCs may be introduced to the wellbore to prevent the loss of drilling fluids into lost circulation zones such as voids, vugular zones, and natural or induced fractures while drilling. Referring to FIG. 1, an exemplary operating environment of an embodiment of the methods, systems, and apparatuses disclosed herein is depicted. Unless otherwise stated, the horizontal, vertical, or deviated nature of any figure is not to be construed as limiting the wellbore to any particular configuration. As depicted, the operating environment may suitably comprise a drilling rig 106 positioned on the earth's surface 104 and extending over and around a wellbore 114 penetrating a subterranean formation 102 for the purpose of recovering hydrocarbons. The wellbore 114 may be drilled into the subterranean formation 102 using any suitable drilling technique. In an embodiment, the drilling rig 106 comprises a derrick 108 with a rig floor 110. The drilling rig 106 may be conventional and may comprise a motor driven winch and/or other associated equipment for extending a work string, a casing string, or both into the wellbore 114.

In an embodiment, the wellbore 114 may extend substantially vertically away from the earth's surface 104 over a vertical wellbore portion 115, or may deviate at any angle from the earth's surface 104 over a deviated or horizontal wellbore portion 116. In an embodiment, a wellbore like wellbore 114 may comprise one or more deviated or horizontal wellbore portions 116. In alternative operating environments, portions or substantially all of the wellbore 114 may be vertical, deviated, horizontal, and/or curved.

While the operating environment depicted in FIG. 1 refers to a stationary drilling rig 106, one of ordinary skill in the art will readily appreciate that mobile workover rigs, wellbore servicing units (e.g., coiled tubing units), and the like may be similarly employed. Further, while the exemplary operating environment depicted in FIG. 1 refers to a wellbore penetrating the earth's surface on dry land, it should be understood that one or more of the methods, systems, and apparatuses illustrated herein may alternatively be employed in other operational environments, such as within an offshore wellbore operational environment for example, a wellbore penetrating subterranean formation beneath a body of water.

In an embodiment, the LCTC is placed into a wellbore as a single stream through the drill bit forming a plug that substantially eliminates the lost circulation. In some embodiments, subsequent to drilling it may be desirable to remove the plug. In such instances, a method for servicing a wellbore may further comprise introducing one or more oleaginous fluids (e.g., of the type described herein) to the wellbore where the wax material is soluble in the oleaginous fluid. It is contemplated that contacting of the oleaginous fluid with the wax material present in the plug results in solubilization of the wax and restoration of the permeability of the lost circulation zone. It is contemplated one of ordinary skill in the art, with the aid of this disclosure, can determine based on the wax used in the LCTC an oleaginous fluid suitable for use solubilizing the wax and restoring the permeability of the lost circulation zone.

The LCTCs of this disclosure may provide lost circulation control in a sufficiently short time period to prevent the operator from pulling out of the hole and thus reducing nonproductive rig time. Without wishing to be limited by theory, the wax and bridging agent may immediately form a plug which packs off the lost circulation zones in the subterranean formation

EXAMPLES

The ability of LCTCs of the type disclosed herein to function as a lost circulation treatment was investigated. In the following examples pore plugging tests (PPT) were conducted at 175° F. by placing a LCTC sample at 50 lb/bbl over a 190 micrometer (μm) pore throat disc with 1000 psi overpressure. The base formulation for the PPTs comprises 1 barrel (bbl) water, 1.67 lb N-VIS, 5.57 lb N-DRIL HT PLUS, 9.67 lb KCl, and 0.56 lb BARASCAV D. N-VIS viscosifier is a premium quality, clarified Xanthan gum polymer, N-DRIL HT PLUS filtration control agent is a cross-linked starch product, and BARASCAV D scavenger is a dry powder oxygen scavenger, all of which are commercially available from Halliburton Energy Services. The volume of filtrate collected and the filter cake thickness were recorded in milliliters (mL) and millimeters (mm), respectively.

Example 1

The effect of the wax and bridging agent on the LCTC were investigated. Specifically, samples designated A-G were prepared using the previously described base formulation and the amounts and type of BARACARB bridging agent indicated in Table 1. Each of the samples also contained the indicated amount of LMI Better which is a blend of oxidized and low melting point waxes and BARADRIL-N acid soluble drill-in fluid system which is a specialized fluid system commercially available from Halliburton Energy Services. BARACARB 25 bridging agent, BARACARB 50 bridging agent and BARACARB 150 bridging agent are size-ground marble having nominal median particle sizes of 25, 50, and 150 microns respectively. The results of PPT with each sample are also given in Table 1.

TABLE 1

|  | Sample | | | | | | |
|---|---|---|---|---|---|---|---|
|  | A | B | C | D | E | F | G |
| BARADRIL-N (g) | 165.2 | 166.8 | 165.2 | 166.8 | 168.4 | 165.1 | 167.4 |
| BARACARB 25 (g) | 0 | 0 | 1.25 | 1.85 | 2.12 | 1.67 | 2.02 |
| BARACARB 50 (g) | 0 | 0 | 2.5 | 3.7 | 4.25 | 3.33 | 4.05 |
| BARACARB 150 (g) | 12.5 | 18.5 | 8.75 | 12.95 | 14.88 | 11.67 | 14.18 |
| LMI Better (g) | 12.5 | 6.5 | 12.5 | 6.5 | 3.75 | 8.33 | 4.75 |
| 175° F. & 1000 psid |  |  |  |  |  |  |  |
| Fluid thru 190 disc (mL) | N/C | N/C | 130 | 55, 45, 85 | 65 | 90 | 35, 60, 80 |
| Cake thickness (mm) |  |  | 7 | 0-4.5 | 0-4.5 | up to 5 | 0-4 |

N/C = No Control

The results demonstrate that a blend of BARACARB and wax material (e.g., LMI Better) provides a reduction in fluid loss. A ratio of 1:1 BARACARB to wax by volume (e.g., Sample D) or 3:2 by volume (e.g., Sample G) sealed the ceramic discs effectively with about 60 mL of sample. Notably, rounding the mass of the BARACARB grades and wax to whole numbers resulted in much higher fluid loss as shown by comparing the Samples D and G of Table 1 to Samples H and I of Table 2. Samples D and M contained a 1:1 ratio of BARACARB to wax by volume and in the remaining examples this ratio was used unless explicitly stated otherwise.

Example 2

The effect of the wax type on the ability of LCTCs of the type disclosed herein to reduce fluid loss was investigated. Samples H to P were prepared using the previously described base formulation and the amount of bridging agent (e.g., BARACARB) and wax indicated in Table 2. BIO-EXP 10-15 is a polyethylene wax commercially available from Shrieve Chemical, and OX-18 is polyethylene wax commercially available from SSI Chuesi USA. The results of PPT using samples H to P are also shown in Table 2.

The results demonstrate the samples containing an oxidized high melting point polyethylene wax displayed a reduced amount of fluid loss when compared to samples containing a blend of oxidized and low melting point waxes.

Example 3

Additional tests were carried out to evaluate the ability of the LCTCs of this disclosure to plug fractures. In these fracture plugging tests (FPT), discs with 500 μm wide fractures were coated under the previously disclosed conditions. Fluid loss tests using 8.5 and 16 gauge screens were also conducted at 150° F. and 200° F. with 1000 psi differential pressure. FPT were conducted on samples N, P, Q, and R which were formulated as indicated in Table 3.

TABLE 3

|  | Sample | | | |
|---|---|---|---|---|
|  | N | P | Q | R |
| BARADRIL-N | 321.6 | 321.6 | 330.4 | 330.4 |
| BARACARB 25 | 3.7 | 3.7 | 2.5 | 2.5 |

TABLE 2

|  | Sample | | | | | |
|---|---|---|---|---|---|---|
|  | H | I | M | N | O | P |
| BARADRIL-N (g) | 167.5 | 167.5 | 166.8 | 166.8 | 166.8 | 166.8 |
| BARACARB 25 (g) | 2 | 2 | 1.85 | 1.85 | 1.85 | 1.85 |
| BARACARB 50 (g) | 4 | 4 | 3.7 | 3.7 | 3.7 | 3.7 |
| BARACARB 150 (g) | 14 | 14 | 12.95 | 12.95 | 12.95 | 12.95 |
| LMI BETTER (g) | 5 |  |  |  |  |  |
| BIO-EXP 10-15 (g) |  | 5 | 6.5 |  |  |  |
| OX - 7 (g) |  |  |  | 6.5 |  |  |
| OX - 18 (g) |  |  |  |  | 6.5 |  |
| MAPP 40 (g) |  |  |  |  |  | 6.5 |
| 175° F. & 1000 psid |  |  |  |  |  |  |
| Fluid thru 190 disc (mL) | 100 | 47, 42 | 10, 12 | 15, 11 | 10, 18 | 20, 28 |
| Cake thickness (mm) | up to 4 | 0-5 | 0-2 | 0-3 | 0-3 | 0-3 |

TABLE 3-continued

| | Sample | | | |
|---|---|---|---|---|
| | N | P | Q | R |
| BARACARB 50 | 7.4 | 7.4 | 5 | 5 |
| BARACARB 150 | 25.9 | 25.9 | 17.5 | 17.5 |
| OX-7 | 13 | | 25 | |
| MAPP 40 | | 13 | | 25 |

The results of the FPT are presented in Table 4.

TABLE 4

| | Sample | | | | | |
|---|---|---|---|---|---|---|
| | N | P | | Q | R | |
| | | 150° F. & 1000 pisd | | | | |
| | 8.5 gauge | 16 gauge | 8.5 gauge | 16 gauge | 8.5 gauge | 16 gauge |
| Fluid thru screen (mL) | 35 | N/C | 4 | 15 | N/C | 35* |

N/C = No Control
*Test at 200° F.

The results demonstrate that the oxidized wax performs well in the LCTC because of the lower volume of fluid through the screens.

Example 4

The ability of oil alone to remove a filtercake formed using an LCTC of the type disclosed herein was investigated. Specifically, discs which were plugged with Samples N or P were treated with either SOLTROL 170 which is an oil used to simulate crude oil return in permeability tests or diesel. The samples were treated as follows: plugged discs were rinsed gently with water and then placed in a second Pore Plugging Apparatus (PPA) cell containing 250 mL of either SOLTROL 170 or diesel. SOLTROL 170 isoparaffin is a solvent commercially available from Chevron Phillips Chemical Company. The sample was then heated to 250° F. and allowed to soak for a total of 1 hour. The oil was then pushed through the disc during a second hour to expose the disc to fresh oil. After cooling, the disc was removed and examined to determine how well it was cleaned.

Figure 3:
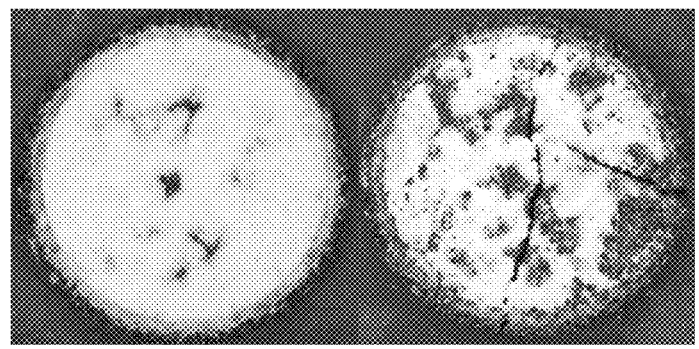
Figure 3:
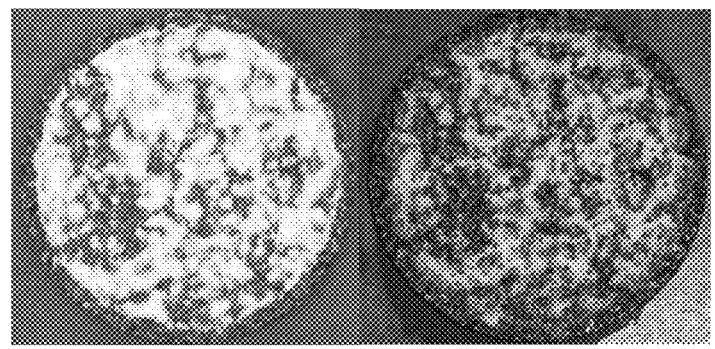
Figure 4:
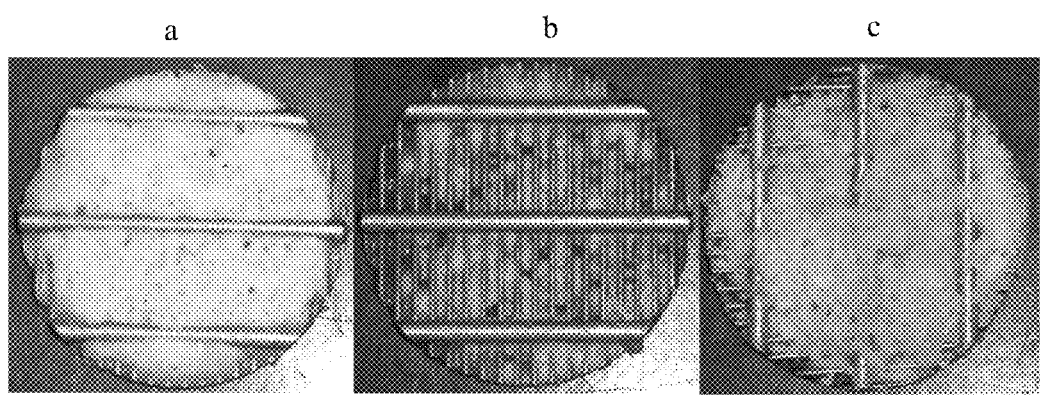

Images of the screens plugged by Samples D, N, M, O, and P before (on the left) and after (on the right) treatment of with SOLTROL 170 are presented in FIGS. 2a, 2b, 2c, 2d, and 2e respectively. Images of the screens plugged by Samples N and P before (on the left) and after (on the right) treatment with diesel are presented in FIGS. 3a and 3b. Diesel was also used to treat the 8.5 and 16 gauge screens coated with samples N, P and R. The images of these screens after treatment are shown in FIGS. 4a, 4b, and 4c respectively. The results demonstrate that a range of oleaginous fluids can be used to remove the oxidized wax material.

Example 5

Figure 5:
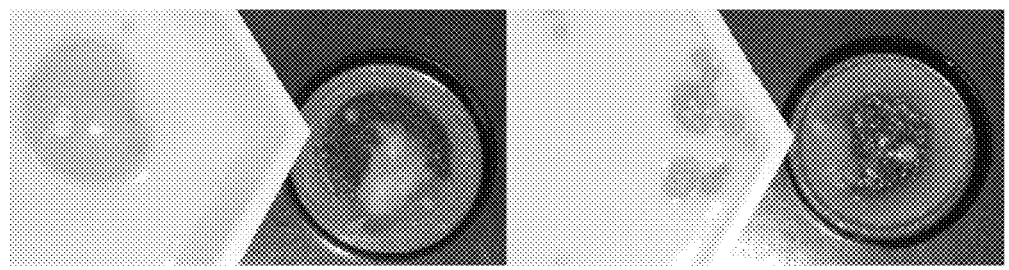
FIGS. 5a-5c are images of screens treated with the samples from Example 5.0
Figure 5:
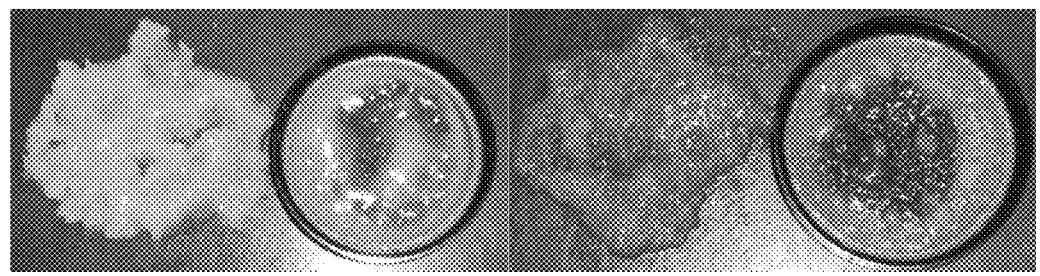
Figure 5:
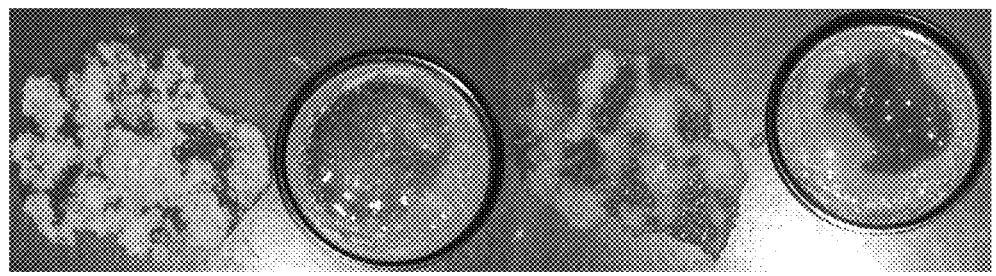

The compatibility of the wax materials with various lubricants was investigated. Samples N or P were dynamically aged with 4% lubricant at 150° F. for 4 hours. The lubricants used were DRILL-N-SLIDE lubricant, BARO-LUBE GOLD SEAL lubricant, TORQ-TRIM 22 lubricant, NXS-LUBE extreme pressure lubricant, and EZ-GLIDE lubricant all of which are commercially available from Halliburton Energy Services. The samples formed into balls when diesel or DRILL-N-SLIDE lubricants were used. The samples became sticky when incubated with NXS-LUBE but were unaffected by incubation with BAROLUBE GOLD SEAL, TORQ TRIM 22 or EZ-GLIDE. Images of Sample N (left) or Sample P (right) after incubation with diesel, NXS-LUBE or BAROLUBE GOLD SEAL are presented in FIGS. 5a, 5b, and 5c respectively. The results demonstrate the wax material displayed better results with surfactant blends as lubricants as opposed using to oils or modified oils as lubricants.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising;
   identifying a lost circulation zone within a wellbore; and
   placing in the wellbore a composition comprising a wax and a water-based mud wherein placement of the composition reduces or prevents a loss of fluids to the lost circulation zone and wherein the wax has a needle penetration at 77° F. of equal to or less than about 5 mm.

2. The method of claim 1 wherein the wax comprises a natural wax, a synthetic wax, or combinations thereof.

3. The method of claim 1 wherein the wax has a melting point of from about 190° F. to about 500° F.

4. The method of claim 1 wherein the wax is an oxidized wax.

5. The method of claim 1 wherein the wax is an oxidized polyethylene wax, a blend of oxidized polyethylene waxes, an oxidized polypropylene wax, a blend of oxidized polypropylene waxes or combinations thereof.

6. The method of claim 1 wherein the wax has a saponification number of from about 0 to about 150 mg KOH/g.

7. The method of claim 1 wherein the wax has an acid number of from about 0 to about 60 mg KOH/g.

8. The method of claim 1 wherein the wax has an oil swellability of less than about 50% by volume.

9. The method of claim 1 wherein the wax has a softening point of greater than about 200° F.

10. The method of claim 1 wherein the wax is present in the composition in an amount of from about 5 lb/bbl to about 50 lb/bbl.

11. The method of claim 1 wherein the composition further comprises a bridging agent.

12. The method of claim 11 wherein the bridging agent comprises a sized calcium carbonate.

13. The method of claim 11 wherein the bridging agent is present in the composition in an amount of from about 0 to about 90 lb/bbl.

14. The method of claim 1 further comprising introducing to the wellbore an oleaginous fluid wherein the wax is soluble in the oleaginous fluid.

15. The method of claim 1 wherein the wax has a needle penetration at 77° F. of equal to or less than about 3 mm.

\* \* \* \* \*